United States Patent
Lee et al.

(10) Patent No.: US 9,846,753 B2
(45) Date of Patent: Dec. 19, 2017

(54) MONTE CARLO SIMULATION FOR ANALYZING YIELD OF AN ELECTRIC CIRCUIT

(71) Applicant: Samsung Electronics Co., Ltd., Suwon-si (KR)

(72) Inventors: Jin-Young Lee, Yongin-si (KR); Chang-Ho Han, Hwaseong-si (KR)

(73) Assignee: Samsung Electronics Co., Ltd. (KR)

(*) Notice: Subject to any disclaimer, the term of this patent is extended or adjusted under 35 U.S.C. 154(b) by 696 days.

(21) Appl. No.: 14/215,577

(22) Filed: Mar. 17, 2014

(65) Prior Publication Data

US 2014/0350900 A1 Nov. 27, 2014

(30) Foreign Application Priority Data

May 27, 2013 (KR) .................. 10-2013-0059878

(51) Int. Cl.
*G06F 17/50* (2006.01)

(52) U.S. Cl.
CPC ...... *G06F 17/5036* (2013.01); *G06F 17/5009* (2013.01); *G06F 2217/10* (2013.01)

(58) Field of Classification Search
CPC ............. G06F 17/5036; G06F 17/5009; G06F 2217/10

See application file for complete search history.

(56) References Cited

U.S. PATENT DOCUMENTS

| | | | |
|---|---|---|---|
| 7,114,138 B1 | 9/2006 | Teig et al. | |
| 7,380,225 B2* | 5/2008 | Joshi .................. | G06F 17/5036 703/2 |
| 8,001,493 B2 | 8/2011 | Joshi et al. | |
| 8,005,660 B2 | 8/2011 | Chiu et al. | |

(Continued)

FOREIGN PATENT DOCUMENTS

| | | |
|---|---|---|
| JP | 2005019524 | 1/2005 |
| KR | 2005078071 | 8/2005 |
| KR | 2011116563 | 10/2011 |

OTHER PUBLICATIONS

Abu-Rahma, M. H. & Anis, M. "A Methodology for Statistical Estimation of Read Access Yield in SRAMs" Nanometer Variation-Tolerant SRAM, pp. 119-153 (Sep. 2012) available from <http://link.springer.com/chapter/10.1007/978-1-4614-1749-1_5>.*

(Continued)

*Primary Examiner* — Jay B Hann
(74) *Attorney, Agent, or Firm* — Onello & Mello LLP

(57) ABSTRACT

In a simulation system and method thereof, the simulation includes, when a function value for a nominal point (NP) of an input is a first value, running a first simulation on the input; and when the function value for the NP of the input is a second value different from the first value, running a second simulation on the input. Here, the running of the second simulation may include (a) setting a boundary of an input distribution for the second value as a first distribution value, (b) generating input samples within the set boundary of the input distribution, (c) obtaining a worst case point (Continued)

(WCP) for the input by performing machine learning on the generated input samples, and (d) repeatedly performing the steps (a) to (c) while shifting the boundary of the input distribution until the boundary of the input distribution reaches a minimum critical value.

30 Claims, 12 Drawing Sheets

(56) References Cited

U.S. PATENT DOCUMENTS

| | | | |
|---|---|---|---|
| 8,046,200 B2 | 10/2011 | Kirby et al. | |
| 8,155,938 B2* | 4/2012 | Singhee | G06F 17/5036 703/6 |
| 8,190,543 B2 | 5/2012 | Kaushal et al. | |
| 8,219,355 B2 | 7/2012 | Tiwary et al. | |
| 8,290,761 B1 | 10/2012 | Singhee et al. | |
| 8,352,895 B2* | 1/2013 | Wason | G06F 17/5036 716/108 |
| 8,374,839 B2* | 2/2013 | Satoh | G06F 17/5036 703/14 |
| 8,589,852 B1* | 11/2013 | Liu | G06F 17/5036 716/132 |
| 8,595,664 B2* | 11/2013 | Gattiker | G06F 17/5036 716/111 |
| 8,935,131 B2* | 1/2015 | Iwane | G06F 17/505 703/2 |
| 9,348,680 B2* | 5/2016 | Joshi | G06F 17/5022 |
| 9,461,876 B2* | 10/2016 | Van Dusen | G06Q 10/10 |
| 2008/0195325 A1 | 8/2008 | Joshi et al. | |
| 2010/0076741 A1 | 3/2010 | Takeuchi | |
| 2010/0217568 A1 | 8/2010 | Takeuchi | |
| 2010/0287604 A1 | 11/2010 | Potkonjak et al. | |
| 2012/0245906 A1 | 9/2012 | Kareem et al. | |
| 2012/0259446 A1 | 10/2012 | Mcconaghy et al. | |

OTHER PUBLICATIONS

Singhee, A. & Rutenbar, R.A. "Statistical Blockade: Very Fast Statistical Simulation and Modeling of Rare Circuit Events and Its Application to Memory Design" IEEE Transactions on Computer-Aided Design of Integrated Circuits & Sys. vol. 28, No. 8 (2009).*
Kanj, R., et al. "Mixture Importance Sampling and Its Application to the Analysis of SRAM Designs in the Presence of Rare Failure Events" Proceedings of 43rd Annual Design Automation Conf. DAC'06, pp. 69-72 (2006) available from <http://dl.acm.org/citation.cfm?id=1146930>.*
Singhee, A., et al. "Recursive Statistical Blockade: An Enhanced Technique for Rare Event Simulation with Application to SRAM Circuit Design" IEEE 21st Int'l Conf. on VLSI Designs (2008) available from <http://ieeexplore.ieee.org/abstract/document/4450492/>.*

* cited by examiner

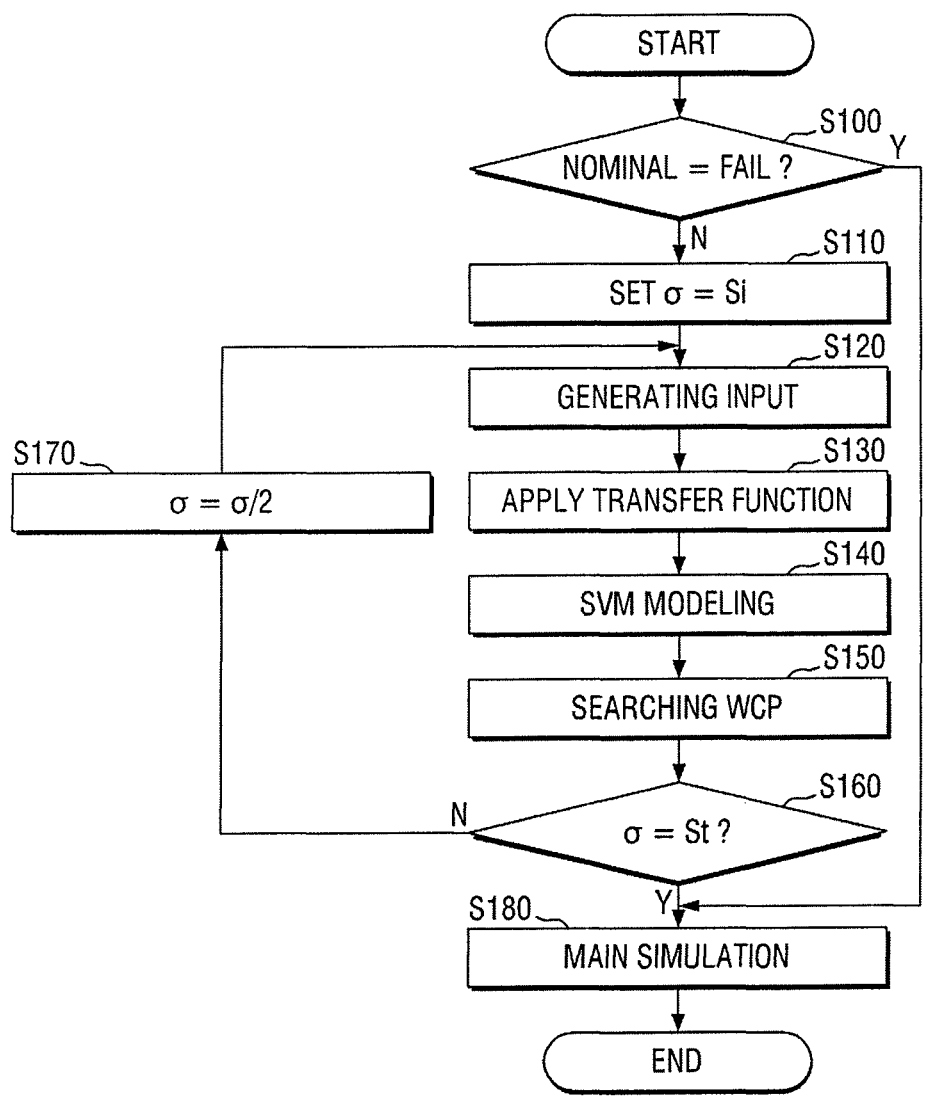

FAIL

PASS

MONTE CARLO SIMULATION FOR ANALYZING YIELD OF AN ELECTRIC CIRCUIT

CROSS-REFERENCE TO RELATED APPLICATION

This application claims priority from Korean Patent Application No. 10-2013-0059878 filed on May 27, 2013 in the Korean Intellectual Property Office, and all the benefits accruing therefrom under 35 U.S.C. 119, the contents of which in its entirety are herein incorporated by reference.

BACKGROUND

1. Technical Field

Embodiments of the present inventive concepts relate to a simulation system and method thereof, and a computing system including the simulation system.

2. Description of the Related Art

When a system, for example a transfer function, has an associated complexity exceeding a predetermined level, interpretation of an input-and-output relationship is essential for understanding the system. The reliability of a real system can be analyzed using a simulation without the need for an actual physical embodiment of the system by analyzing the probability of a given output (Pass, Fail) when an input distribution is measured for interpretation of the system.

However, as the complexity of a system increases, the required computing resources may increase significantly, as well as the time and costs, for the simulation. In some cases, a simulation result may not be obtained within a time span of a year, even through supercomputing. For example, billions of simulations may be required when a range of a distribution to be analyzed is greater than or equal to $6\sigma$ relative the center value.

SUMMARY

Embodiments of the present inventive concepts provide a simulation system having an increased analysis speed of an input and improved reliability.

Embodiments of the present inventive concepts also provide a simulation method having an increased analysis speed of an input and improved reliability.

Embodiments of the present inventive concepts also provide a computing system including the simulation system.

These and other objects of the present inventive concepts will be described in or be apparent from the following description of embodiments.

According to an aspect of the present inventive concepts, there is provided a simulation method using a computing system including one or more processors, the simulation method comprising: when a function value for a nominal point (NP) of an input is a first value, running a first simulation on the input; and when the function value for the NP of the input is a second value different from the first value, running a second simulation on the input; wherein the running of the second simulation comprises: (a) setting a boundary of an input distribution for the second value as a first distribution value; (b) generating input samples within the set boundary of the input distribution; (c) obtaining a worst case point (WCP) for the input by performing machine learning on the generated input samples; and (d) repeatedly performing the steps (a) to (c) while shifting the boundary of the input distribution until the boundary of the input distribution reaches a minimum critical value.

In some embodiments, the first simulation includes a Monte Carlo simulation.

In some embodiments, the second simulation includes an importance sampling.

In some embodiments, the generating of the input samples within the set boundary of the input distribution comprises generating the input samples within the set boundary of the input distribution using uniform distribution sampling.

In some embodiments, the first value corresponds to a fail condition and wherein the second value corresponds to a pass condition.

According to an aspect of the present inventive concepts, there is provided a simulation method using a computing system including one or more processors, the simulation method comprising: (a) setting a boundary of an input distribution as a first distribution value; (b) generating input samples within the set boundary of the input distribution; (c) obtaining function values for the respective generated input samples; (d) obtaining a boundary plane by performing machine learning on the respective generated input samples; (e) determining a worst case point (WCP) for the input on the boundary plane; and (f) repeatedly performing the steps (a) to (e) while shifting the boundary of the input distribution until the boundary of the input distribution reaches a minimum critical value.

In some embodiments, the shifting of the boundary of the input distribution comprises changing the boundary of the input distribution from the first distribution value to a second distribution value.

In some embodiments, the second distribution value is smaller than the first distribution value.

In some embodiments, at least one of the minimum critical value, the first distribution value and the second distribution value is a value that can be set by a user.

In some embodiments, the generating of the input samples within the set boundary of the input distribution comprises generating the input samples within the set boundary of the input distribution using uniform distribution sampling.

In some embodiments, the obtaining of the boundary plane by performing machine learning on the input samples and function values comprises obtaining the boundary plane using a support vector machine (SVM).

In some embodiments, determining the WCP for the input on the boundary plane comprises determining the WCP using an evolutionary algorithm (EA).

According to another aspect of the present inventive concepts, there is provided a simulation system comprising: a main simulation module running a simulation operation based on a center of a provided distribution; a determining module providing a zero point (ZP) for an input to the main simulation module when a function value for a nominal point (NP) of the input is a first value, and running a second simulation on the input when the function value for the NP of the input is a second value different from the first value; and a worst case point (WCP) determining module obtaining a WCP for the input by repeatedly performing generating input samples within a set boundary of the input distribution while shifting a boundary of an input distribution for the second value, and providing the obtained WCP to the main simulation module.

In some embodiments, the simulation operation includes a Monte Carlo simulation.

In some embodiments, the generating of the input samples within the set boundary of the input distribution comprises generating the input samples within the set boundary of the input distribution using uniform distribution sampling.

In some embodiments, the WCP determining module obtains the WCP for the input by repeatedly performing generating input samples within the set boundary of the input distribution while shifting a boundary of an input distribution for the second value comprising: (a) setting a boundary of an input distribution for the second value as a first distribution value; (b) generating input samples within the set boundary of the input distribution; (c) obtaining function values for the respective generated input samples; (d) obtaining a boundary plane by performing machine learning on the respective generated input samples; (e) determining a worst case point (WCP) for the input on the boundary plane; and (f) repeatedly performing the steps (a) to (e) while shifting the boundary of the input distribution until the boundary of the input distribution reaches a minimum critical value.

In some embodiments, the shifting of the boundary of the input distribution comprises changing the boundary of the input distribution from the first distribution value to a second distribution value.

In some embodiments, the second distribution value is smaller than the first distribution value.

In some embodiments, at least one of the minimum critical value, the first distribution value and the second distribution value is a value that can be set by a user.

In some embodiments, the obtaining of the boundary plane by performing machine learning on the input samples and function values comprises obtaining the boundary plane using a support vector machine (SVM).

In some embodiments, the WCP determining module determines the WCP for the input on the boundary plane using an evolutionary algorithm (EA).

In some embodiments, the main simulation module, the determining module and the WCP determining module are driven by one or more processors.

In some embodiments, the first value corresponds to a fail condition and wherein the second value corresponds to a pass condition.

According to an aspect of the present inventive concepts, there is provided a computing system comprising: one or more processors; and a storage unit in which program codes for performing a simulation for an input using the processors are stored, wherein when a function value for a nominal point (NP) of the input is a first value, a first simulation for the input is run, and when the function value for the NP of the input is a second value different from the first value, a second simulation for the input is run, the running of the second simulation comprising: (a) setting a boundary of an input distribution for the second value as a first distribution value; (b) generating input samples within the set boundary of the input distribution; (c) obtaining a worst case point (WCP) for the input by performing machine learning on the generated input samples; and (d) repeatedly performing the steps (a) to (c) while shifting the boundary of the input distribution until the boundary of the input distribution reaches a minimum critical value.

In some embodiments, the first simulation includes a Monte Carlo simulation and the second simulation includes an importance sampling.

In some embodiments, the shifting of the boundary of the input distribution comprises changing the boundary of the input distribution from the first distribution value to a second distribution value, and the generating of the input samples within the set boundary of the input distribution comprises generating the input samples within the set boundary of the input distribution using uniform distribution sampling.

In some embodiments, the second distribution value is smaller than the first distribution value.

In some embodiments, the first value corresponds to a fail condition and wherein the second value corresponds to a pass condition.

According to another aspect of the present inventive concepts, there is provided a simulation method for a computing system including one or more processors, the simulation method comprising: performing a main simulation as one of a first simulation and a second simulation based on a provided input distribution; in a case where a function value for a nominal point of the input distribution is a first value, providing a zero point (ZP) for the input distribution to the main simulation, and the main simulation performing the first simulation in response thereto; and in a case where the function value for the nominal point of the input distribution is a second value that is different than the first value, performing a worst case point (WCP) determination for the input distribution by repeatedly performing generating input samples within a set boundary of the input distribution while shifting a boundary of the input distribution, providing the determined worst case point (WCP) value to the main simulation, and the main simulation performing the second simulation in response thereto.

In some embodiments, performing the worst case point determination further comprises: (a) setting the boundary of an input distribution as a first distribution value; (b) generating input samples within the set boundary of the input distribution; (c) obtaining function values for the respective generated input samples; (d) obtaining the boundary plane by performing machine learning on the respective generated input samples; (e) determining the worst case point (WCP) for the input on the boundary plane; and (f) repeatedly performing the steps (a) to (e) while shifting the boundary of the input distribution until the boundary of the input distribution reaches a minimum critical value.

In some embodiments, the shifting of the boundary of the input distribution comprises changing the boundary of the input distribution from the first distribution value to a second distribution value.

In some embodiments, the second distribution value is smaller than the first distribution value.

In some embodiments, at least one of the minimum critical value, the first distribution value and the second distribution value is a value that can be set by a user.

In some embodiments, the generating of the input samples within the set boundary of the input distribution comprises generating the input samples within the set boundary of the input distribution using uniform distribution sampling.

In some embodiments, the obtaining of the boundary plane by performing machine learning on the input samples and function values comprises obtaining the boundary plane using a support vector machine (SVM).

In some embodiments, determining the WCP for the input on the boundary plane comprises determining the WCP using an evolutionary algorithm (EA).

In some embodiments, the first simulation includes a Monte Carlo simulation.

In some embodiments, the second simulation includes an importance sampling.

BRIEF DESCRIPTION OF THE DRAWINGS

The above and other features and advantages of the present inventive concepts will become more apparent by describing in detail embodiments thereof with reference to the attached drawings in which:

FIG. 3 is a flowchart for explaining a simulation method according to some embodiments of the present inventive concepts;

DETAILED DESCRIPTION OF EMBODIMENTS

Figure 1:
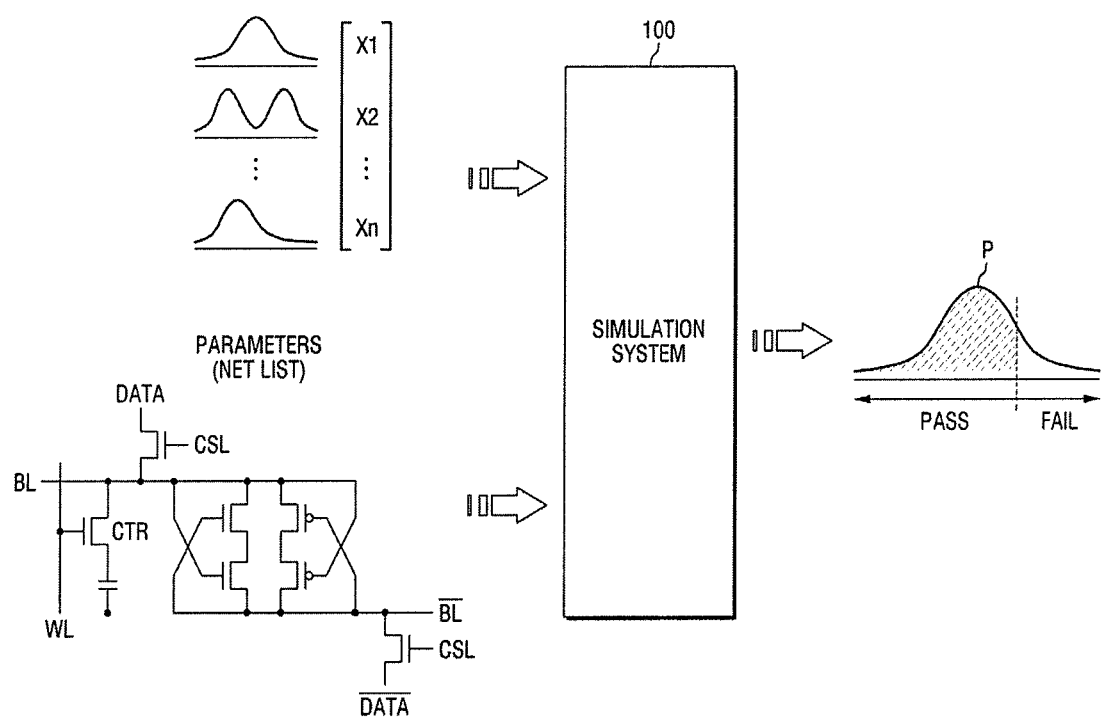
FIG. 1 is a block diagram of a simulation system according to some embodiments of the present inventive concepts.

Advantages and features of the present inventive concepts and methods of accomplishing the same may be understood more readily by reference to the following detailed description of embodiments and the accompanying drawings. The present inventive concepts may, however, be embodied in many different forms and should not be construed as being limited to the embodiments set forth herein. Rather, these embodiments are provided so that this disclosure will be thorough and complete and will fully convey the concept of the inventive concepts to those skilled in the art, and the present inventive concepts will only be defined by the appended claims. In the drawings, the thickness of layers and regions are exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

The use of the terms "a" and "an" and "the" and similar referents in the context of describing the inventive concepts (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concepts.

Unless defined otherwise, all technical and scientific terms used herein have the same meaning as commonly understood by one of ordinary skill in the art to which the present inventive concepts belong. It is noted that the use of any and all examples, or exemplary terms provided herein is intended merely to better illuminate the inventive concepts and is not a limitation on the scope of the inventive concepts unless otherwise specified. Further, unless defined otherwise, all terms defined in generally used dictionaries may not be overly interpreted.

Figure 2:
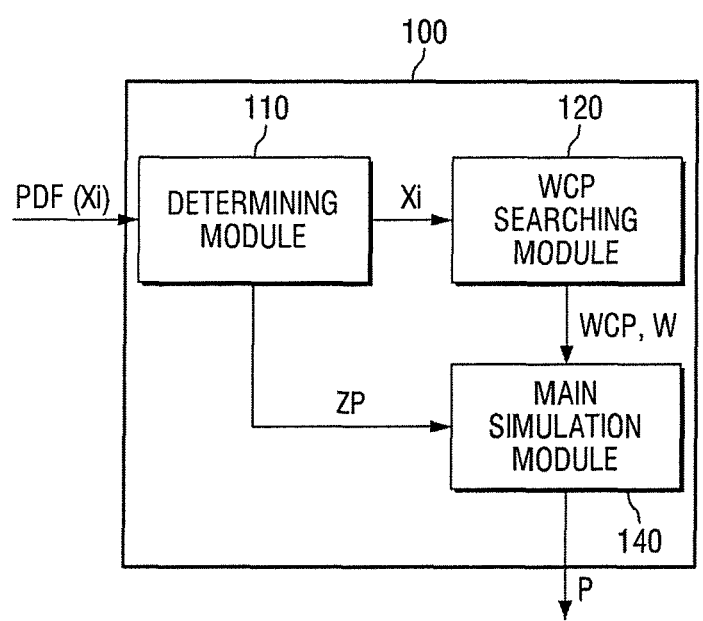
FIG. 2 is a detailed block diagram of the simulation system shown in FIG. 1.

FIG. 1 is a block diagram of a simulation system according to some embodiments of the present inventive concepts and FIG. 2 is a detailed block diagram of the simulation system shown in FIG. 1.

Referring to FIG. 1, n inputs X1 to Xn (Here, n is a natural number.) having an arbitrary mean ($\mu$) and a deviation ($\sigma$) may be provided to the simulation system 100 according to some embodiments of the present inventive concepts. The n inputs may be n input parameters necessary to analyze a particular circuit.

For example, if the simulation system 100 according to some embodiments of the present inventive concepts is a system for analyzing the yield of dynamic random access memory (DRAM) cells, as shown in FIG. 1, a plurality of parameters (for example, a net list, characteristic values, etc.) and n inputs X1 to Xn having an arbitrary mean ($\mu$) and a deviation ($\sigma$) for determining characteristics of a DRAM cell may be provided to the simulation system 100. Examples of the n inputs X1 to Xn may include, for example, a thickness of a gate oxide film of a cell transistor (CTR), a threshold voltage, and so on, but aspects of the present inventive concepts are not limited thereto.

Meanwhile, the simulation system 100 performs a simulation on the n inputs X1 to Xn, and a result value y may be indicated in the following equation (1):

$$y=f(x) \qquad (1)$$

Here, the inputs X1 to Xn derive the result value y through a transfer function (f), and the result value y is a real number. In order to define whether the result value y indicates a pass status or a fail status, an indicator function I(y) is defined as expressed by the following equation (2), by which an indicator function value is calculated and a probability of a set of characteristic values to be analyzed:

$$I(y) = \begin{cases} 1, & y \in F \\ -1, & y \notin F \end{cases} \qquad (2)$$

where F means a set of fail statuses, a function value 1 of the indicator function I(y) means a fail status and a function value −1 of the indicator function I(y) means a pass status.

That is to say, the simulation system 100 may output a failure probability (P) of the DRAM cell based on the n inputs X1 to Xn. Unless otherwise defined, the term "function value" used herein will be understood as the indicator function value, but aspects of the present inventive concepts are not limited thereto.

The simulation system 100 may include a determining module 110, a worst case point (WCP) searching module 120, and a main simulation module 140.

As used herein, the "unit" or "module" can refer to either a software element or a hardware element, such as a Field Programmable Gate Array (FPGA) or an Application Specific Integrated Circuit (ASIC), which performs a predetermined function, or both. However, the unit or module does not necessarily have a meaning limited to software or hardware. The module may be constructed in some embodiments to be stored in an addressable storage medium or in some embodiments, to execute one or more processors, or both. Therefore, the module includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the modules may be either combined into a smaller number of elements or modules or divided into a larger number of elements or modules.

The determining module 110 may determine a simulation method for an input (Xi) (X1≤Xi≤Xn) according to the value of the indicator function value I(Xi) for a nominal point (NP) of the input Xi. In further detail, when an indicator function value I(Xi$_{NP}$) for the NP of the input Xi (Here, the NP value may be, for example, a mean value (µ) of the input Xi in the present embodiment.) is a first value (e.g., 1), the determining module 110 may provide a zero point (ZP) for the input Xi, (X1≤Xi≤Xn) to the main simulation module 140 to perform a main simulation for the input Xi, (X1≤Xi≤Xn) in view of the ZP. When the indicator function value I(Xi$_{NP}$) for the NP of the input Xi is a second value (e.g., −1), the determining module 110 may provide the input Xi to the WCP searching module 120 to search the WCP for the input Xi.

When the NP of the arbitrary input Xi corresponds to, for example, a fail status, that is, when the indicator function value I(Xi$_{NP}$) is 1, it is possible to generate a sufficiently large number of failed inputs Xi even by a relatively small number of samplings. However, when the NP of the arbitrary input Xi corresponds to, for example, a pass status, that is, when the indicator function value I(Xi$_{NP}$) is −1, it is not possible to know how many samplings need to be run to generate a number of failed inputs Xi. In an extreme case, for example, if a distribution of failed inputs Xi is greater than or equal to 6σ relative to the NP, 380/z(−6) (=3.85*10$^{11}$) times of sampling or simulations should be run.

Therefore, the simulation system 100 according to some embodiments of the present inventive concepts includes the determining module 110 configured to determine the simulation method for the input Xi according to the value of the indicator function value I(Xi) for the NP of the input Xi, such an extreme case in which the huge number of samplings need to be run can be avoided. That is to say, since the determining module 110 can variably determine the simulation method for the input Xi according to the Probability Distribution Function (PDF) of the input PDF(Xi) of the input Xi, the case, in which the number of times simulations are run is extremely increased, can be avoided. Therefore, the overall analysis speed of the simulation system 100 can be improved.

The WCP searching module 120 may be configured to obtain a WCP for the input Xi by repeatedly performing generating input samples within the set boundary of the input distribution while shifting a boundary of an input distribution for the input Xi and may provide the obtained WCP to the main simulation module 140. In some embodiments of the present inventive concepts, in order to accurately search the WCP for the input Xi, the WCP searching module 120 may repeatedly perform the generating of the input samples within the set boundary of the input distribution while decreasing the distribution boundary for the input Xi. In such a manner, if the generating of the input samples within the set boundary of the input distribution is repeatedly performed while decreasing the distribution boundary for the input Xi, the WCP for the input Xi can be more accurately searched, which will be herein described in further detail.

Meanwhile, in some embodiments of the present inventive concepts, the sampling run by the WCP searching module 120 may include, for example, uniform distribution sampling, which will also be described herein in further detail.

The main simulation module 140 may be configured to run a predetermined simulation based on the provided distribution center (for example, ZP or WCP of the input Xi). Here, the predetermined simulation may include, for example, a Monte Carlo simulation. That is to say, the main simulation module 140 may output a probability P that a particular function value (e.g., −1) exists by performing a Monte Carlo simulation on the input Xi. Meanwhile, when the WCP for the provided input Xi is obtained, the main simulation module 140 runs the Monte Carlo simulation on the input Xi in consideration of a calibration coefficient (W) generated in the course of searching the WCP. The main simulation module 140 will be described herein in further detail.

Hereinafter, a simulation system and method according to some embodiments of the present inventive concepts will be described with reference to FIGS. 3 to 10.

FIG. 3 is a flowchart for explaining a simulation method according to some embodiments of the present inventive concepts and FIGS. 4A through 10 illustrate a simulation method according to some embodiments of the present inventive concepts.

First, referring to FIG. 3, it is determined whether a function value for the NP of the input is a fail or not (S100). As the result, when the function value for the NP of the input corresponds to a fail status, a main simulation for the input is run (S180).

In detail, referring to FIG. 2, when the function value I(Xi$_{NP}$) for the NP of the input distribution PDF(Xi) corresponds to a fail status (e.g., 1), the determining module 110 may provide the zero point ZP as the center of the distribution of the input Xi to the main simulation module 140. In response, in some embodiments, the main simulation module 140 may run, for example, a Monte Carlo simulation, on the input Xi based on the center of the provided distribution.

Figure 4A:
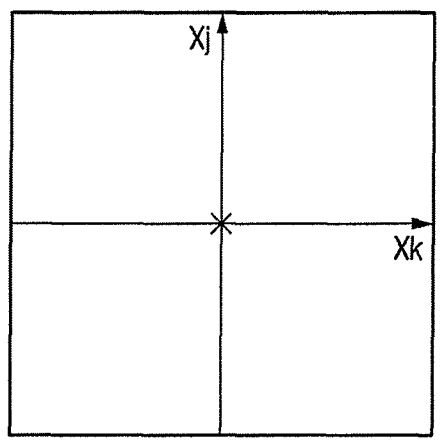
FIGS. 4A through 10 illustrate a simulation method according to some embodiments of the present inventive concepts.

More specifically, when the function value for the NP of inputs (Xj, Xk) corresponds to a fail status, as shown in FIG. 4A, the determining module 110 may provide the ZP as the center of the distribution of the inputs (Xj, Xk) to the main simulation module 140, and the main simulation module 140 may run, for example, a Monte Carlo simulation, on the inputs (Xj, Xk).

In some embodiments of the present inventive concepts, the nominal point NP of inputs (Xi, Xk) and the zero point ZP of the inputs (Xi, Xk) may be equal to each other, but aspects of the present inventive concepts are not limited thereto. In modified embodiments, the NP of the inputs (Xi, Xk) and the ZP of the inputs (Xi, Xk) may be different from each other.

FIG. 4A illustrates two inputs (Xj, Xk) as inputs of the simulation system 100, but aspects of the present inventive concepts are not limited thereto. That is to say, FIG. 4A illustrates only the two inputs (Xj, Xk), which is, however, provided only for a better understanding of the simulation method according to embodiments of the present inventive concepts. Unlike in the illustrated embodiment, the number of inputs provided to the simulation system 100 may vary. For example, if three inputs are provided to the simulation system 100, a region formed by three input parameters may be a stereoscopic space, instead of a plane shown in FIG. 4A.

Referring again to FIG. 3, when the function value for the NP of the input corresponds to a pass condition, if a Monte Carlo simulation is run on the input, in the worst case, the number of times samplings or simulations are run may drastically increase so as not to be practically processed. In this case, in the present embodiment, a simulation may be run using, for example, importance sampling.

Figure 4B:
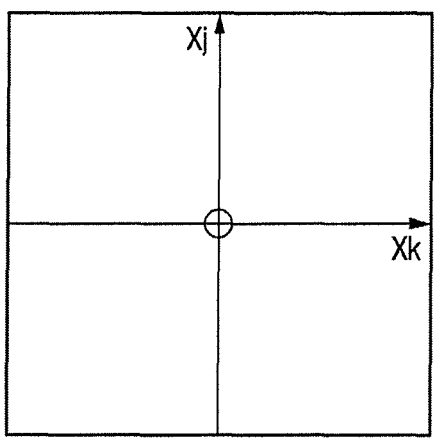

In order to implement the importance sampling, the WCP or shift vector of the inputs (Xj, Xk) is determined. Therefore, when the function value for the NP of inputs (Xj, Xk) corresponds to a pass status, as shown in FIG. 4B, the determining module 110 may provide the inputs (Xj, Xk) to the WCP searching module 120 to allow the WCP searching module 120 to search the WCP for the inputs (Xj, Xk). In some embodiments, the WCP searching module 120 may search the WCP for the inputs (Xj, Xk) through the following process.

Referring to FIG. 3, first, a distribution boundary of the inputs (Xj, Xk) is set to a first distribution value Si (S110). In some embodiments of the present inventive concepts, 8σ, for example, may be selected as the first distribution value Si, but aspects of the present inventive concepts are not limited thereto. In addition, in some embodiments of the present inventive concepts, the first distribution value Si may be a two or more dimensional value having coordinates, but aspects of the present inventive concepts are not limited thereto.

Figure 5:
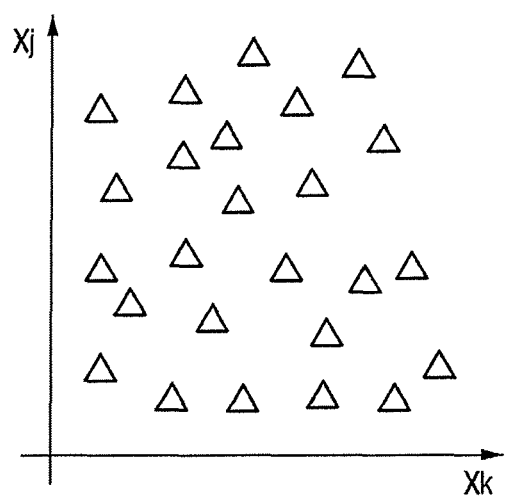

Next, referring to FIG. 3, input samples are generated within a set distribution boundary (S120). In some embodiments of the present inventive concepts, uniform distribution sampling, for example, may be used in the generating of input samples (Xj, Xk). If the input samples (Xj, Xk) is generated using the uniform distribution sampling in such a manner, the input samples (Xj, Xk) may have a uniform distribution, as shown in FIG. 5. In FIG. 5, input samples (Xj, Xk) indicated by triangles mean that function values for the respective inputs (Xj, Xk) have not been obtained yet, and boundaries of the inputs (Xj, Xk) may be −8σ and 8σ, respectively.

Figure 6:
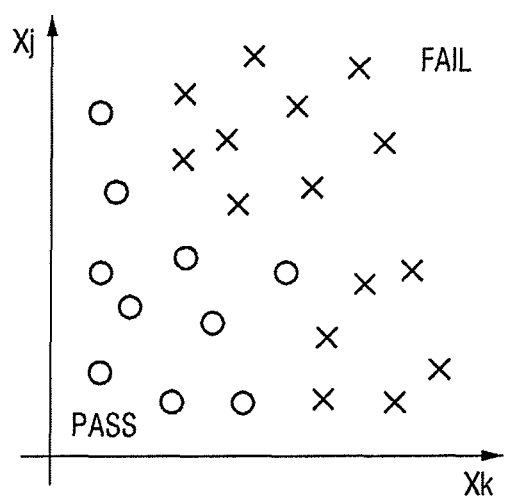

Next, referring to FIG. 3, a transfer function is applied to each of the inputs (Xj, Xk) and function values for the respective generated inputs (Xj, Xk) are obtained (S130). In detail, the function values for the respective generated inputs (Xj, Xk) may be obtained using the above-described indicator function I(y) given by the equation (2). FIG. 6 illustrates that the function values for the respective generated inputs (Xj, Xk) are obtained using the above-described indicator function I(y) given by the equation (2). Here, a sample indicated by "X" means a fail status, that is, the function value is 1, and a sample indicated by "O" means a pass status, that is, the function value is −1.

Next, referring to FIG. 3, machine learning is performed on the generated input samples and the obtained function values to obtain a boundary plane (S140). In some embodiments of the present inventive concepts, support vector machine (SVM) may be used in obtaining the boundary plane. In addition, in some embodiments of the present inventive concepts, the boundary plane may be, for example, a curved plane, but aspects of the present inventive concepts are not limited thereto.

Figure 7:
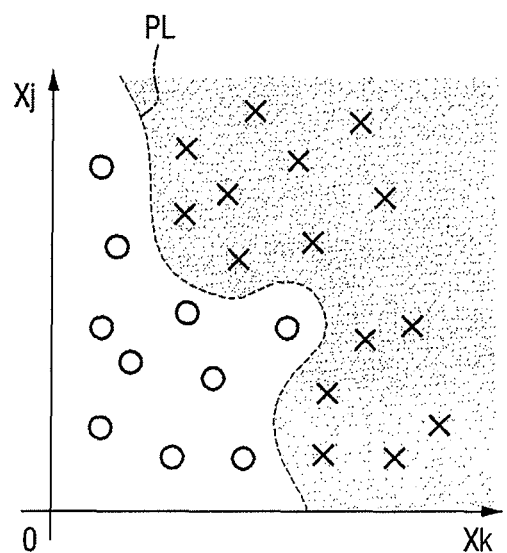
Figure 8:
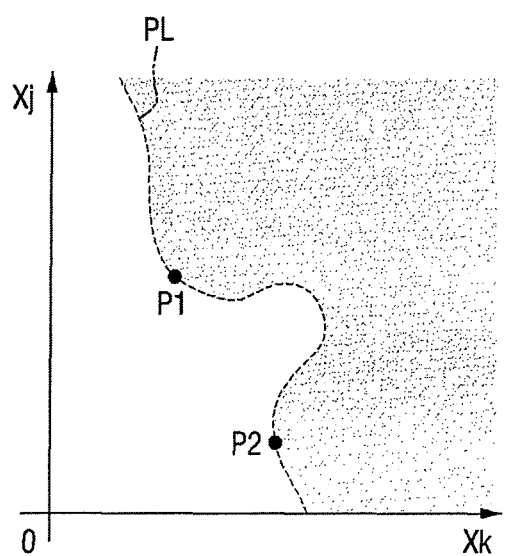

FIG. 7 illustrates an embodiment whereby the boundary plane PL for defining the obtained function values is obtained by performing machine learning using SVM. While FIG. 7 illustrates that the boundary plane PL is curved, in some embodiments, the boundary plane PL may be linear according to the obtained function value. In some embodiments, if there are a larger number of input samples (Xj, Xk) than illustrated in FIG. 7, the boundary plane PL may be a stereoscopic (three-dimensional) plane.

Next, referring to FIG. 3, a worst case point (WCP) for the input is searched on the obtained boundary plane (S150). In the present embodiment, an evolutionary algorithm (EA), for example, may be used in searching the WCP for the inputs (Xj, Xk) on the obtained boundary plane PL. In detail, referring to FIG. 8, among candidate points (P1, P2) on the boundary plane PL, the shortest point from the ZP (0,0) may be selected as the WCP.

Referring again to FIG. 3, it is determined whether the set boundary of the input distribution is a minimum critical value or not (S160). As the result, if the set boundary of the input distribution is not within the minimum critical value St, the boundary of the input distribution is decreased to a second distribution value (Si/2) (S170). Thereafter, the above-described steps S120 to S160 are repeatedly performed until the boundary of the input distribution reaches the minimum critical value St. In some embodiments of the present inventive concepts, the minimum critical value St may be a rational number, but aspects of the present inventive concepts are not limited thereto.

In some embodiments of the present inventive concepts, the minimum critical value St of the distribution boundary of the inputs (Xj, Xk) may be set to a. As shown, the distribution boundary of the inputs (Xj, Xk) may gradually decrease. Hereinafter, a process of searching the WCP through the above-described procedure will be described in more detail.

Figure 9A:
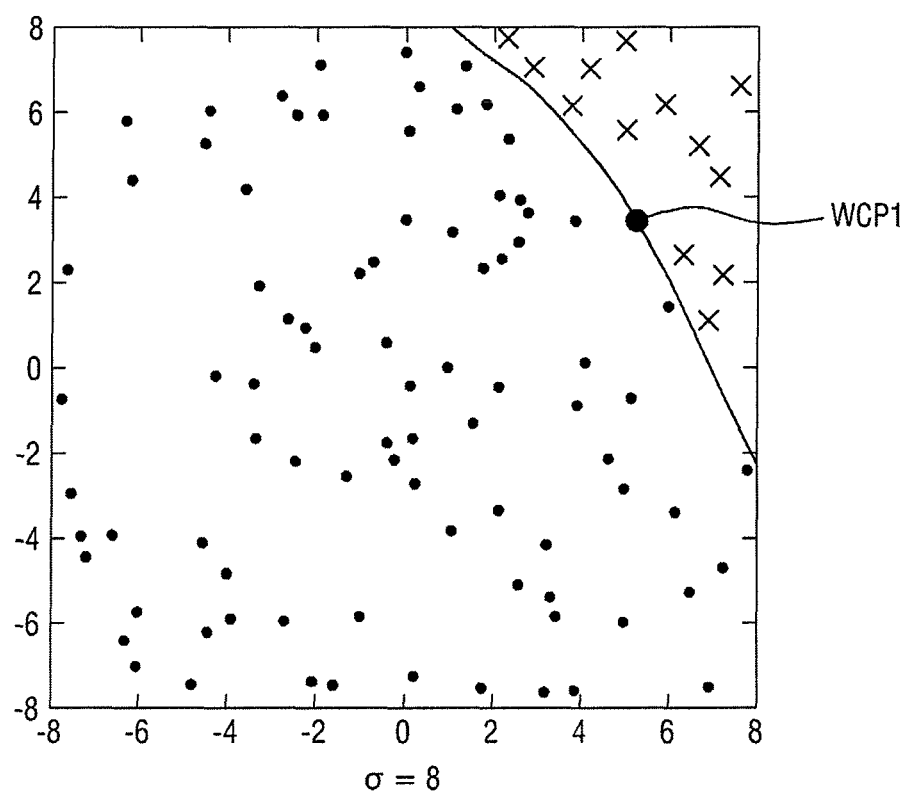

First, referring to FIG. 9A, the distribution boundary of the inputs (Xj, Xk) is set to 8σ (S110). Then, the above-described steps S120 and S130 are preformed, thereby allowing the function values of the inputs (Xj, Xk) to be arranged within 8σ relative to the ZP (0,0). Here, a first WCP (WCP1) is searched by performing the above-described steps S140 and S150.

Figure 9B:
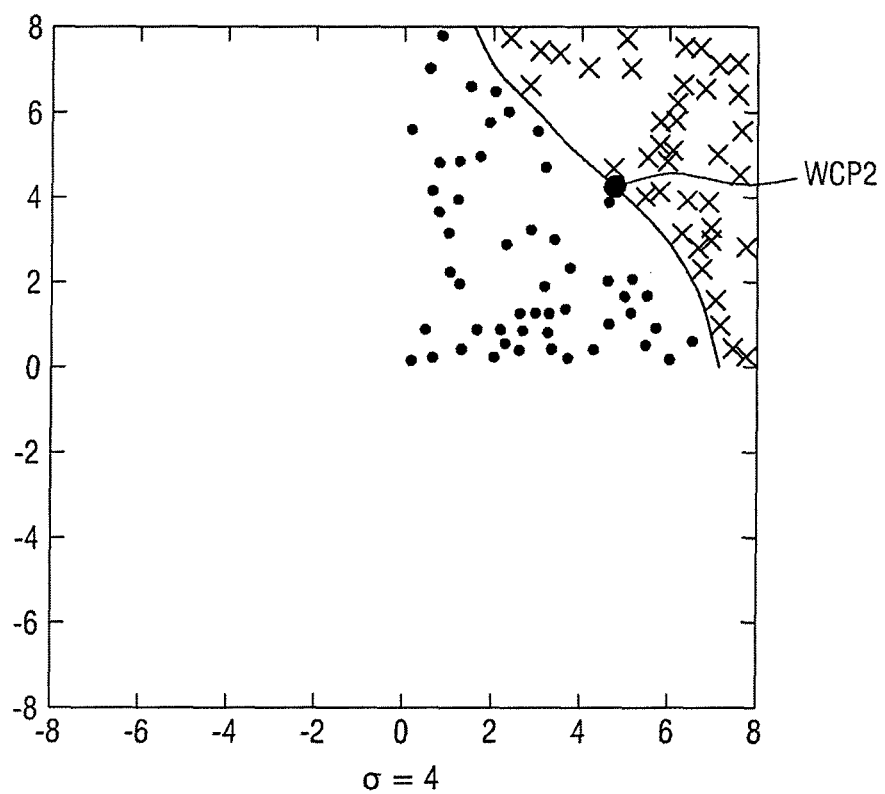

Next, referring to FIG. 9B, the distribution boundary of the inputs (Xj, Xk) is decreased to 4σ from the first WCP (WCP 1 of FIG. 9A) (S170), and the above-described steps S120 and S130 are performed. Then, the function values of the inputs (Xj, Xk) are arranged 4σ from the first WCP (WCP1 of FIG. 9A). Here, a second WCP (WCP2) is searched by performing the above-described steps S140 and S150.

Figure 9C:
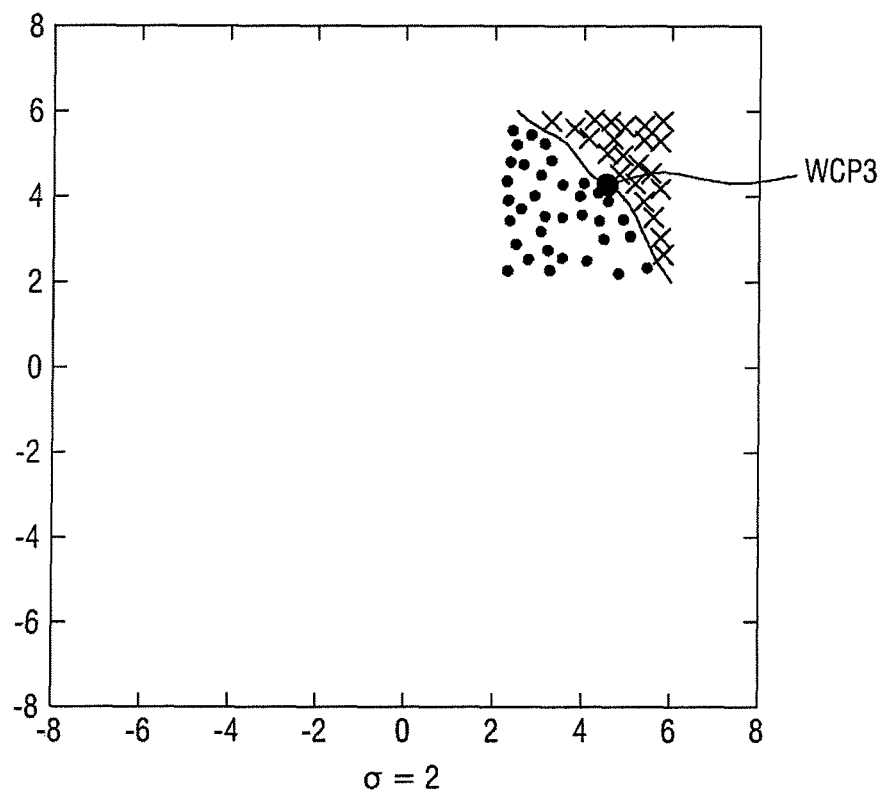

Next, referring to FIG. 9C, the distribution boundary of the inputs (Xj, Xk) is decreased to 2σ from the second WCP (WCP2 of FIG. 9B) (S170), and the above-described steps S120 and S130 are performed. Then, the function values of the inputs (Xj, Xk) are arranged within 2σ from the second WCP (WCP2 of FIG. 9B). Here, a third WCP (WCP3) is searched by performing the above-described steps S140 and S150.

Figure 9D:
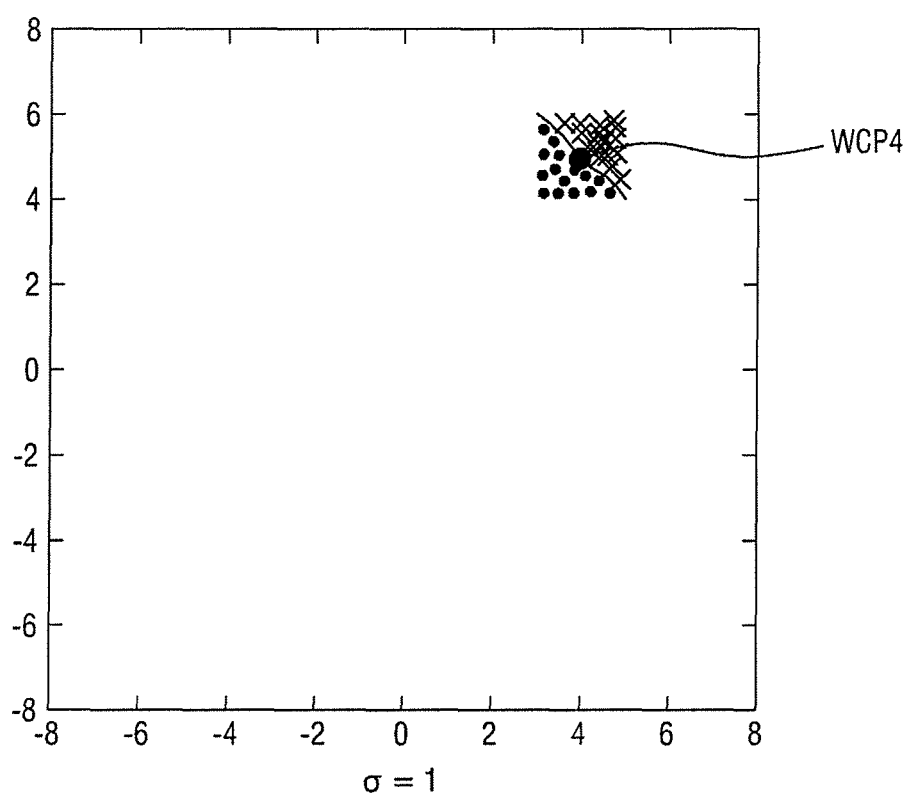
Figure 10:
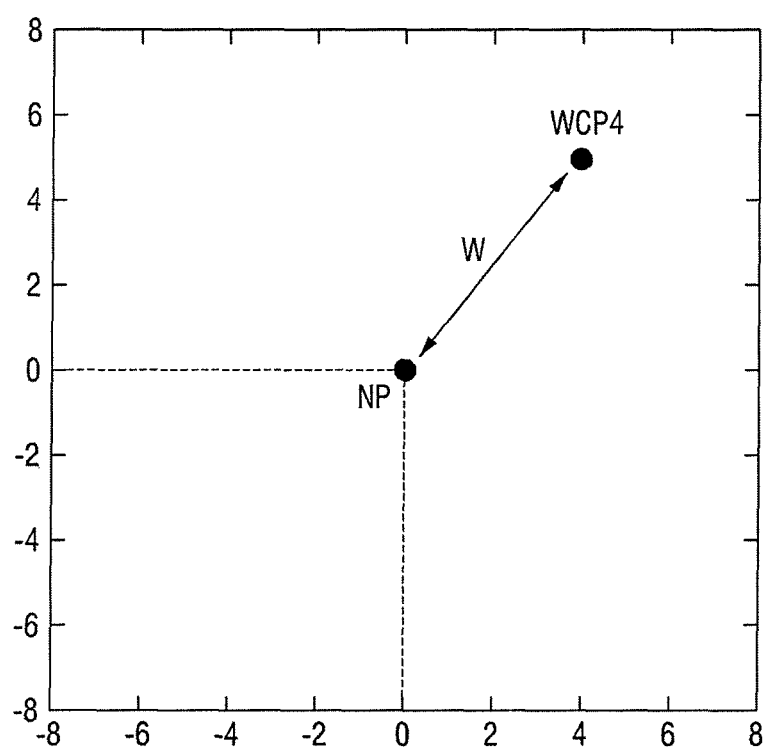

Next, referring to FIG. 9D, the distribution boundary of the inputs (Xj, Xk) is decreased to σ from the third WCP (WCP3 of FIG. 9C) (S170), and the above-described steps S120 and S130 are performed. Then, the function values of the inputs (Xj, Xk) are arranged within a from the third WCP (WCP3 of FIG. 9C) and σ. Here, a fourth WCP (WCP4) is searched by performing the above-described steps S140 and S150.

Now that the distribution boundary of the inputs (Xj, Xk) is a that is the minimum critical value St, the searched fourth WCP (WCP4) is the final WCP of the inputs (Xj, Xk). Therefore, referring to FIG. 2, the WCP searching module 120 provides the searched WCPs and a calibration coefficient W depending on the shift of the center of the input distribution to the main simulation module 140.

In some embodiments of the present inventive concepts, at least one of the minimum critical value St, the first distribution value Si, and the second distribution value Si/2 set by decreasing the first distribution value Si, may be optionally set by a user.

In the above-described embodiment, it has been illustrated that the second distribution value Si/2 is decreased from the first distribution value Si, but aspects of the present inventive concepts are not limited thereto. In some other embodiments of the present inventive concepts, the second distribution value Si/2 may be set to increase from the first distribution value Si. In addition, in some other embodiments of the present inventive concepts, the second distribution value Si/2 and the first distribution value Si may be set to be equal to each other. In the respective cases, the minimum critical value St may be differently set in various manners.

Referring back to FIG. 3, a main simulation is run (S170). In detail, next, referring to FIGS. 2 and 10, the main simulation module 140 runs, for example, a Monte Carlo simulation, for the inputs (Xj, Xk) based on the searched WCPs. Here, calibration may be performed on the simulation result based on the calibration coefficient W provided from the WCP searching module 120.

As described above, in the simulation system and method according to embodiments of the present inventive concepts, simulation methods for an input may vary in consideration of characteristics of the input. In detail, when a function value for the NP of an input corresponds to a fail status, a sufficiently large number of failed inputs Xi can be generated even by a relatively small number of samplings. Thus, a Monte Carlo simulation is run based on the ZP of the input as the center of the input distribution. When a function value for the NP of an input corresponds to a pass status, in order to avoid an extremely increasing simulation time, a simulation is run on the input using importance sampling. Accordingly, it is possible to prevent the simulation time from extremely increasing according to the characteristics of the input.

The following table 1 shows results of experiments for comparison of numbers of times samplings or simulations need to be run according to the failure rate of inputs for the purpose of accounting for the performance of the above-described simulation system (100 of FIG. 1) according to some embodiments of the present inventive concepts.

Here, inputs (1) to (5) are set such that a distribution of the inputs is a normal distribution, and the reliability level of the experiments was set to 95%. In table 1, X indicates results of Monte Carlo simulations run on the inputs (1) to (5), Y indicates results of the above-described simulation methods according to some embodiments of the present inventive concepts performed on the inputs (1) to (5), and Z indicates results of other simulation methods using clustering, an alternative approach to the simulation methods of the inventive concepts.

TABLE 1

| Input | X | | Y | | Z | |
|---|---|---|---|---|---|---|
| | Failure rate | Run no. | Failure rate | Run no. | Failure rate | Run no. |
| (1) | 1.77e−1 | 470 | 1.60e−1 | 2770 | 1.81e−1 | 3520 |
| (2) | 7.63e−3 | 13100 | 6.58e−3 | 2910 | 5.74e−3 | 9280 |
| (3) | 1.79e−4 | 559000 | 1.80e−4 | 3390 | 1.70e−4 | 3968 |
| (4) | 9.05e−6 | 7262500 | 9.12e−6 | 3500 | 7.30e−6 | 9856 |
| (5) | 3.14e−6 | 9324300 | 3.21e−6 | 3500 | 2.87e−6 | 16704 |

Referring to Table 1, as the failure rate of inputs is reduced, the number of X-simulations increases exponentially while the number of Y-simulations increases little. Meanwhile, for inputs having substantially the same failure rate, the number of X-simulations is smaller than the number of Y-simulations. That is to say, according to the above-described simulation system and method according to some embodiments of the present inventive concepts, it is possible to prevent the simulation time from extremely increasing by modifying the simulation according to the characteristics of the input.

Meanwhile, in order to efficiently perform importance sampling, the WCP is searched for the input. Therefore, in the present embodiment, in order to accurately search the WCP for the input, the WCP for the input is searched while gradually reducing the boundary of the input distribution. The thus searched WCP has much increased accuracy, and the reliability of the simulation result is therefore greatly improved.

Hereinafter, a computing system employing a simulation system according to some embodiments of the present inventive concepts will be described with reference to FIG. 11.

Figure 11:
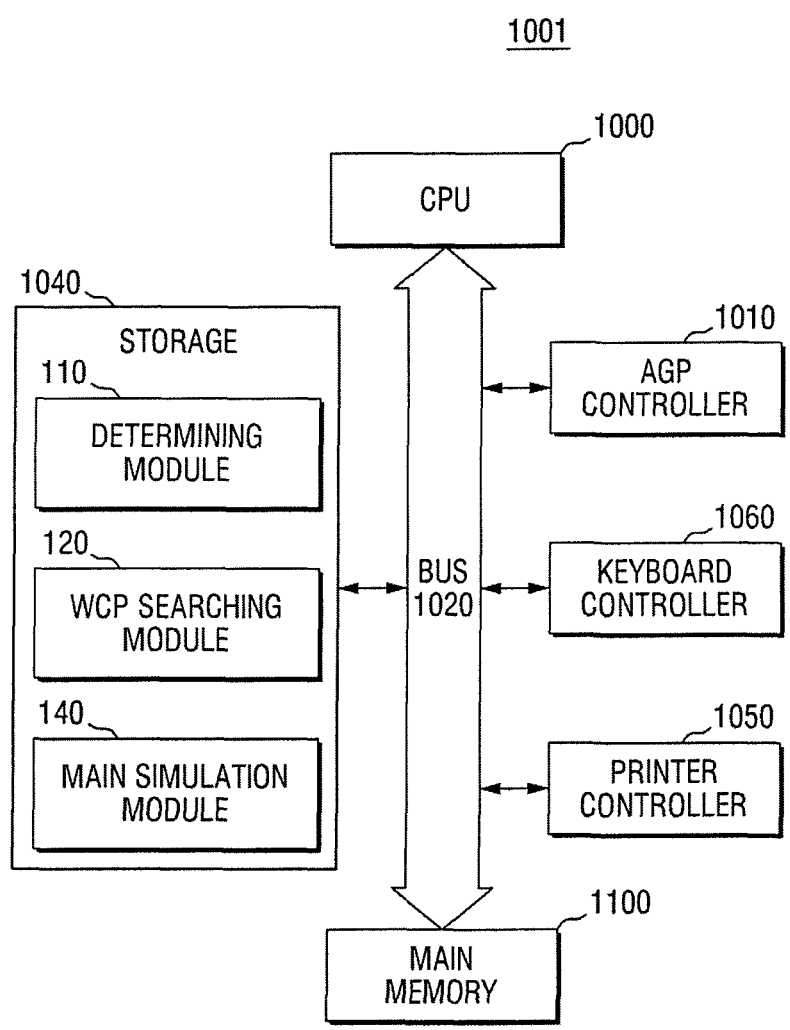
FIG. 11 illustrates an exemplary computing system employing a simulation system according to some embodiments of the present inventive concepts.

FIG. 11 illustrates an exemplary computing system employing a simulation system according to some embodiments of the present inventive concepts.

Referring to FIG. 11, the above-described simulation system (100 of FIG. 1) according to some embodiments of the present inventive concepts may be implemented as, for example, software, to be employed to the computing system 1001 shown in FIG. 11.

The computing system 1001 may include a central processing unit (CPU) 1000, an accelerated graphics port (AGP) controller 1010, a main memory 1100, a storage 1040 (e.g., SSD, HDD, etc.), a bus 1020, a keyboard controller 1060, and a printer controller 1050. In FIG. 11, only some components of the computing system 1001 are illustrated, but aspects of the present inventive concepts are not limited thereto. Components of the computing system 1001 may be added or omitted from the configuration shown in FIG. 11.

In some embodiments, the computing system 1001 shown in FIG. 11 may comprise an office computer or a notebook computer used for semiconductor simulation. In addition, in some other embodiments of the present inventive concepts, the computing system 1001 shown in FIG. 11 may be a computing system driven by multiple processors in a multi-processor environment, but aspects of the present inventive concepts are not limited thereto. Examples of the computing system 1001 may be modified in various manners.

In the computing system 1001, the CPU 1000, the AGP controller 1010, the main memory 1100, the storage 1040, the keyboard controller 1060, the printer controller 1050, and other peripheral devices may be connected to the bus 1020, but aspects of the present inventive concepts are not limited thereto. The bus 1020 may be modified to be incorporated into the CPU 1000.

In some embodiments, the AGP may have a bus specification to provide for fast implementation of 3D graphic representation. The AGP controller 1010 may include a video card for playback of a monitor image.

In some embodiments, the CPU 1000 may be configured to perform various operations required for driving the computing system 1001 and may execute an operating system (OS) and application programs. In FIG. 11, only one CPU 1000 is illustrated, but the number of CPUs 1000 may vary according to the application.

In some embodiments, the main memory 1100 may load data required to perform the operation of the CPU 1000 from the storage 1040 and may store the loaded data. An exemplary memory of the main memory 1100 may comprise a DRAM, but aspects of the present inventive concepts are not limited thereto.

In some embodiments, the storage 1040 may comprise a large-capacity data storage device storing data, and may be implemented by, for example, a computer readable recording medium, such as HDD or SSD, but aspects of the present inventive concepts are not limited thereto. In addition, in the computing system 1001 according to the embodiment of the present inventive concepts, the storage 1040 is connected to the bus 1020, but aspects of the present inventive concepts are not limited thereto. That is to say, the storage 1040 may be modified to be directly connected to the CPU 1000.

When the computing system 1001 according to embodiments of the present inventive concepts employs the simulation system (100 of FIG. 1) implemented using software, etc., the simulation system (100 of FIG. 1) may be stored in, for example, the storage 1040, as shown in FIG. 11.

In detail, the determining module (110 of FIG. 2), WCP searching module (120 of FIG. 2) and the main simulation module (140 of FIG. 2), which constitute the simulation system (100 of FIG. 1) according to some embodiments of the present inventive concepts may be implemented independently to then be stored in the storage 1040.

The respective modules 110, 120 and 140 stored in the storage 1040 are loaded to the main memory 1100 and then processed by the CPU 1000, thereby outputting a probability value (P of FIG. 1) as the final output of the simulation system (100 of FIG. 1).

A program recordable recording medium according to some embodiments of the present inventive concepts will now be described.

Examples of the program recordable recording medium for implementing a simulation method according to some embodiments of the present inventive concepts may include, a computer hard disk, a floppy disk, a 3.5 inch disk, a computer storage tape, a magnetic drum, an SRAM cell, a DRAM cell, an electrically erasable memory, such as an EEPROM cell, an EPROM cell, or a flash cell, a nonvolatile cell, a ferroelectric memory, a magnetic random access memory, a compact disk (CD), a laser disk, an optical disk, and so on, but aspects of the present inventive concepts are not limited thereto. Indeed, any type or form of storage media that are readable using a computer may be used as the program recordable recording medium for implementing a simulation method according to some embodiments of the present inventive concepts.

While the present inventive concepts have been particularly shown and described with reference to exemplary embodiments thereof, it will be understood by those of ordinary skill in the art that various changes in form and details may be made herein without departing from the spirit and scope of the inventive concepts as defined by the following claims. It is therefore desired that the present embodiments be considered in all respects as illustrative and not restrictive, reference being made to the appended claims rather than the foregoing description to indicate the scope of the inventive concepts.

What is claimed is:

1. A simulation method for a computing system including one or more processors, the simulation method comprising:
   performing a main simulation as one of a first simulation and a second simulation based on an input deviation, wherein the input deviation is a distribution of a characteristic of a design of an electric circuit;
   in a case where a function value for a nominal point of the input deviation is a first value, providing a zero point (ZP) for the input deviation to the main simulation, and the main simulation performing the first simulation in response thereto; and
   in a case where the function value for the nominal point of the input deviation is a second value that is different than the first value, performing a worst case point (WCP) determination for the input deviation by repeatedly performing generating samples of an input within a set boundary of the input deviation while shifting a boundary of the input deviation by reducing the input deviation until the input deviation reaches a minimum critical value, providing the determined worst case point (WCP) value to the main simulation, and the main simulation performing the second simulation in response thereto, wherein the input is the characteristic of the design of the electric circuit.

2. The simulation method of claim 1 wherein performing the worst case point determination further comprises:
   (a) setting the boundary of the input deviation as a first deviation value;
   (b) generating samples of the input within the set boundary of the input deviation;
   (c) obtaining function values for the respective generated samples of the input;
   (d) obtaining a boundary plane by performing machine learning on the respective generated samples of the input;
   (e) determining the worst case point (WCP) for the input on the boundary plane; and
   (f) repeatedly performing the steps (a) to (e) while shifting the boundary of the input deviation by reducing the input deviation until the input deviation reaches a minimum critical value.

3. A simulation method using a computing system including one or more processors, the simulation method comprising:
   when a function value for a nominal point (NP) of an input is a first value, running a first simulation on the input, wherein the input is a characteristic of a design of an electric circuit; and
   when the function value for the NP of the input is a second value different from the first value, running a second simulation on the input;
   wherein the running of the second simulation comprises:
   (a) setting a boundary of an input deviation for the second value as a first deviation value, wherein the input deviation is a deviation of the characteristic of the design of the electric circuit;
   (b) generating samples of the input within the set boundary of the input deviation;
   (c) obtaining a worst case point (WCP) for the input by performing machine learning on the generated samples of the input; and
   (d) repeatedly performing the steps (a) to (c) while shifting the boundary of the input deviation by reducing the input deviation until the input deviation reaches a minimum critical value.

4. The simulation method of claim 3, wherein the first simulation includes a Monte Carlo simulation.

5. The simulation method of claim 4, wherein the second simulation includes an importance sampling.

6. The simulation method of claim 1, wherein the generating of the samples of the input within the set boundary of the input deviation comprises generating the samples of the input within the set boundary of the input deviation using uniform distribution sampling.

7. The simulation method of claim 3 wherein the first value corresponds to a fail condition and wherein the second value corresponds to a pass condition.

8. A simulation method using a computing system including one or more processors, the simulation method comprising:
(a) setting a boundary of an input deviation as a first deviation value, wherein the input deviation is a deviation of a characteristic of a design of an electric circuit;
(b) generating samples of the input within the set boundary of the input deviation, wherein the input is the characteristic of the design of the electric circuit;
(c) obtaining function values for the respective generated samples of the input;
(d) obtaining a boundary plane by performing machine learning on the respective generated samples of the input;
(e) determining a worst case point (WCP) for the input on the boundary plane; and
(f) repeatedly performing the steps (a) to (e) while shifting the boundary of the input deviation by reducing the input deviation until the input deviation reaches a minimum critical value.

9. The simulation method of claim 8, wherein the shifting of the boundary of the input deviation comprises changing the boundary of the input deviation from the first deviation value to a second deviation value.

10. The simulation method of claim 9, wherein the second deviation value is smaller than the first deviation value.

11. The simulation method of claim 9, wherein at least one of the minimum critical value, the first deviation value and the second deviation value is a value that can be set by a user.

12. The simulation method of claim 8, wherein the generating of the input samples within the set boundary of the input deviation comprises generating the input samples within the set boundary of the input deviation using uniform distribution sampling.

13. The simulation method of claim 8, wherein the obtaining of the boundary plane by performing machine learning on the input samples and function values comprises obtaining the boundary plane using a support vector machine (SVM).

14. The simulation method of claim 8, wherein determining the WCP for the input on the boundary plane comprises determining the WCP using an evolutionary algorithm (EA).

15. A simulation system comprising:
a storage unit in which a plurality of module program codes are stored;
one or more processors configured to execute the plurality of module codes; and
wherein the plurality of module codes comprise:
a main simulation module running a simulation operation based on a center of an input deviation, wherein the input deviation is a deviation of a characteristic of a design of an electric circuit;
a determining module providing a zero point (ZP) for an input to the main simulation module when a function value for a nominal point (NP) of the input is a first value, and running a second simulation on the input when the function value for the NP of the input is a second value different from the first value, wherein the input is the characteristic of the design of the electric circuit; and
a worst case point (WCP) determining module obtaining a WCP for the input by repeatedly performing generating samples of the input within a set boundary of the input deviation while shifting a boundary of the input deviation for the second value by reducing the input deviation until the input deviation reaches a minimum critical value, and providing the obtained WCP to the main simulation module.

16. The simulation system of claim 15, wherein the WCP determining module obtains the WCP for the input by repeatedly performing generating samples of the input within the set boundary of the input deviation while shifting a boundary of the input deviation for the second value comprises:
(a) setting a boundary of the input deviation for the second value as a first deviation value;
(b) generating samples of the input within the set boundary of the input deviation;
(c) obtaining function values for the respective generated samples of the input;
(d) obtaining a boundary plane by performing machine learning on the respective generated samples of the input;
(e) determining a worst case point (WCP) for the input on the boundary plane; and
(f) repeatedly performing the steps (a) to (e) while shifting the boundary of the input deviation by reducing the input deviation until the input deviation reaches a minimum critical value.

17. The simulation system of claim 16, wherein the shifting of the boundary of the input deviation comprises changing the boundary of the input deviation from the first deviation value to a second deviation value.

18. The simulation system of claim 17, wherein the second deviation value is smaller than the first deviation value.

19. The simulation system of claim 16, wherein at least one of the minimum critical value, the first deviation value and the second deviation value is a value that can be set by a user.

20. The simulation system of claim 16, wherein the obtaining of the boundary plane by performing machine learning on the samples of the input and function values comprises obtaining the boundary plane using a support vector machine (SVM).

21. The simulation system of claim 16, wherein the WCP determining module determines the WCP for the input on the boundary plane using an evolutionary algorithm (EA).

22. The simulation system of claim 15, wherein the main simulation module, the determining module and the WCP determining module are driven by one or more processors.

23. The simulation system of claim 15 wherein the first value corresponds to a fail condition and wherein the second value corresponds to a pass condition.

24. The simulation system of claim 15, wherein the simulation operation includes a Monte Carlo simulation.

25. The simulation system of claim 15, wherein the generating of the samples of the input within the set boundary of the input deviation comprises generating the samples of the input within the set boundary of the input deviation using uniform distribution sampling.

26. A computing system comprising:
one or more processors; and
a storage unit in which program codes for performing a simulation for an input using the processors are stored, wherein the input is a characteristic of a design of an electric circuit and,
wherein when a function value for a nominal point (NP) of the input is a first value, a first simulation for the input is run, by the one or more processors, and when the function value for the NP of the input is a second value different from the first value, a second simulation for the input is run, by the one ore more processors, the running of the second simulation comprising:

(a) setting a boundary of an input deviation for the second value as a first deviation value, wherein the input deviation is a deviation of the characteristic of the design of the electric circuit;

(b) generating samples of the input within the set boundary of the input distribution deviation;

(c) obtaining a worst case point (WCP) for the input by performing machine learning on the generated input samples; and (d) repeatedly performing the steps (a) to (c) while shifting the boundary of the input deviation by reducing the input deviation until the input deviation reaches a minimum critical value.

27. The computing system of claim 26, wherein the first simulation includes a Monte Carlo simulation and the second simulation includes an importance sampling.

28. The computing system of claim 26, wherein the shifting of the boundary of the input deviation comprises changing the boundary of the input deviation from the first deviation value to a second deviation value, and the generating of the samples of the input within the set boundary of the input deviation comprises generating the samples of the input within the set boundary of the input deviation using uniform distribution sampling.

29. The computing system of claim 28, wherein the second deviation value is smaller than the first deviation value.

30. The computing system of claim 26 wherein the first value corresponds to a fail condition and wherein the second value corresponds to a pass condition.

\* \* \* \* \*